(12) United States Patent
Van Der Tempel et al.

(10) Patent No.: US 12,341,932 B2
(45) Date of Patent: Jun. 24, 2025

(54) NEIGHBORHOOD-GATED SWITCHING PIXEL SENSOR

(71) Applicant: VOXELSENSORS SRL, Brussels (BE)

(72) Inventors: Ward Van Der Tempel, Keerbergen (BE); Johannes Willem Peeters, Antwerp (BE); André Bernard Miodezky, Ukkel (BE); Christian Mourad, Genval (BE)

(73) Assignee: VOXELSENSORS SRL, Brussels (BE)

( * ) Notice: Subject to any disclaimer, the term of this patent is extended or adjusted under 35 U.S.C. 154(b) by 164 days.

(21) Appl. No.: 18/268,947

(22) PCT Filed: Dec. 23, 2021

(86) PCT No.: PCT/EP2021/087594
§ 371 (c)(1),
(2) Date: Jun. 21, 2023

(87) PCT Pub. No.: WO2022/136682
PCT Pub. Date: Jun. 30, 2022

(65) Prior Publication Data
US 2024/0080581 A1    Mar. 7, 2024

(30) Foreign Application Priority Data

Dec. 23, 2020   (BE) .................................. 2020/5975
Apr. 1, 2021    (BE) .................................. 2021/5251

(51) Int. Cl.
*H04N 25/773*   (2023.01)
*H04N 25/40*    (2023.01)
(52) U.S. Cl.
CPC ........... *H04N 25/773* (2023.01); *H04N 25/40* (2023.01)

(58) Field of Classification Search
CPC ............................. H04N 25/40; H04N 25/773
(Continued)

(56) References Cited

U.S. PATENT DOCUMENTS

| 12,212,871 B2 | 1/2025 | Van Der Tempel et al. |
| 2011/0168909 A1 | 7/2011 | Nakao |

(Continued)

FOREIGN PATENT DOCUMENTS

| JP | H07302928 A | 11/1995 |
| JP | 2010078338 A | 4/2010 |

(Continued)

OTHER PUBLICATIONS

Notice of Allowance mailed Sep. 17, 2024, for U.S. Appl. No. 17/928,249, filed Nov. 28, 2022, seven pages.

(Continued)

*Primary Examiner* — Joel W Fosselman
(74) *Attorney, Agent, or Firm* — Morrison & Foerster LLP

(57) ABSTRACT

The present invention relates to an imaging sensor system (26) having a high detection accuracy. The system (26) comprises a plurality of pixel sensors (1) and at least one light source. The pixel sensors (1) are grouped in clusters, wherein each pixel sensor (1) comprises a photodetector (2) and a local controlling circuit (18). The plurality of sensors (1) in each cluster are configured, using local controlling circuits (18), to output a global detection signal (15) when detecting a local detection signal (10) from at least two outputs of the photodetectors (2) of said cluster. The system (26) has a high detection accuracy due to ruling out false positive detections, since each detection requires at least two positive outputs of the photodetectors (2) of said cluster.

19 Claims, 2 Drawing Sheets

(58) Field of Classification Search
USPC ........................................................ 348/308
See application file for complete search history.

(56) References Cited

U.S. PATENT DOCUMENTS

| | | |
|---|---|---|
| 2012/0257789 A1 | 10/2012 | Lee et al. |
| 2018/0225521 A1* | 8/2018 | Harris .................... H04N 25/57 |
| 2018/0262705 A1 | 9/2018 | Park et al. |
| 2020/0326414 A1 | 10/2020 | Delic |
| 2021/0075986 A1 | 3/2021 | Panicacci |
| 2023/0217136 A1 | 7/2023 | Van Der Tempel et al. |

FOREIGN PATENT DOCUMENTS

| | | |
|---|---|---|
| WO | 2013018006 A1 | 2/2013 |
| WO | 2019060942 A1 | 4/2019 |
| WO | 2020127927 A1 | 6/2020 |

OTHER PUBLICATIONS

International Search Report and Written Opinion mailed Sep. 3, 2021, for PCT Application No. PCT/IB2021/054688 filed May 28, 2021, twelve pages.

International Preliminary Report and Written Opinion dated Jun. 13, 2023, for PCT Application No. PCT/EP2021/087594, filed Dec. 23, 2021, ten pages.

International Preliminary Report and Written Opinion dated Nov. 17, 2022, for PCT Application No. PCT/IB2021/054688 filed May 28, 2021, six pages.

Japanese Notice of Reasons for Refusal mailed Aug. 20, 2024, for JP Patent Application No. 2023-537617, with English translation, 14 pages.

* cited by examiner

NEIGHBORHOOD-GATED SWITCHING PIXEL SENSOR

CROSS REFERENCE TO RELATED APPLICATIONS

This application is a national stage application under 35 U.S.C. § 371 of International Application No. PCT/EP2021/087594, filed internationally on Dec. 23, 2021, the contents of which is hereby incorporated by reference in its entirety for all intended purposes.

TECHNICAL FIELD

The present invention relates to an imaging sensor system. In particular, the invention relates to an imaging sensor system having a high detection accuracy.

BACKGROUND

In state of the art scanning active imaging, a light beam, typically a laser, is moved over an area to be captured, and the location where the beam enters is recorded per time of day via multiple image sensors. By processing the differences in location from the different viewpoints (sensors), the effective distance to the illuminated target can be determined via triangulation. Such a measurement captures a voxel. The speed at which this process can be performed, the voxel rate, is limited by the speed at which scanning with the light beam takes place on the one hand, but also (most strongly) limited by the processing time required by the sensors to detect the reflected light beams on the other hand, especially with regard to background radiation (ambient light) and general thermal noise. By specifically tackling this second issue, image formation can be accelerated considerably.

In order to achieve a voxel rate of tens or even hundreds of millions of voxels per second, each voxel must be recorded in a time span of no more than 10 ns. As a result, the sensor must also be suitable for operating with limited photon budgets (i.e. detected impinging photons on the sensor that are sufficient for a detection), such as for instance 10 photons. Given the limited time span for processing, only a limited number of photons can be collected.

Existing image processing and shaping systems process optical input acquired by the sensors either in parallel for all pixels, in the case of a so-called "global shutter", or spread over time with "rolling shutter". In both cases, typical imaging systems have a gain factor of 10 µV to 1 mV per impinging electron, in order to produce a signal that exceeds a minimum detection voltage and can be recorded. In the above range it should be noted that the upper limit of this can only be guaranteed by more recent imagers, which are specifically modified to count photons, and focus on very low detection rates. With such specialized sensors, a signal of 10 mV can be produced for 10 electrons, which signal can be read positively for a specific pixel. To detect an impinging photon package, a minimum number of 10 photons is required, which moreover impinge on the sensor in a time span of 10 ns. What has happened thus far in the prior art is limiting of the exposure time of the sensor, for example to 10 ns, and then reading the sensor to trigger an event via a threshold voltage (i.e. real impingement of reflected beam instead of a false positive from ambient light or thermal noise). The disadvantage of this is that, certainly with high-resolution imagers, the time required to read the sensor dominates the process, and is typically noticeably higher than 10 ns, causing a bottleneck here.

Another disadvantage is that ambient light or thermal noise in one pixel sensor may lead to a false positive e.g. a false detection.

Prior art systems as described in WO2019/060942A1 for instance, provide the signals of the individual detectors to an event circuit per 'grouping' or cluster, which then generates an event trigger if a specific pattern is recognized (possibly from a listing of possible patterns). Upon recognition, the address or identifier of the identified neural feature (pattern) is read out on a data bus. Alternatively, the addresses of the SPADs could be read out. However, this has a number of drawbacks, as neural feature circuits are provided for each cluster, giving rise to potential issues.

Other systems, such as US2018/0225521A1, use localized event cross-detections that are built into the pixel, but do not provide for an efficient way to determine the locations of the events. Furthermore, the reliability of the event detection is not high enough in the case of the aforementioned application due to the use of only one 'confirmed' pixel per cluster.

The present invention aims to resolve at least some of the problems mentioned above.

SUMMARY OF THE INVENTION

In a first aspect, the present invention relates to an imaging sensor system comprising:
  a plurality of pixel sensors (1), wherein the pixel sensors (1) are grouped in at least one local cluster comprising at least two pixel sensors (1), wherein each pixel sensor (1) of the local cluster adjoins at least one other pixel sensor of the local cluster, wherein each sensor (1) comprises:
    a photodetector capable of detecting single photons impinging thereon, the photodetector having an output for outputting an electrical local detection signal upon detection of a photon,
    a local controlling circuit,
  wherein the plurality of sensors in the cluster are configured, using a local controlling circuit, to output a global detection signal when detecting a local detection signal from at least two outputs of the photodetectors of said cluster;
  at least one light source;
  wherein the local controlling circuit of each sensor comprises:
    local enabling means,
    neighborhood enabling means, connected to the local enabling means, wherein the local detection signal of the sensor is provided to the local enabling means in the sensor,
  wherein the neighborhood enabling means of the sensor is provided with at least one local detection signal of at least one other sensor in the cluster, wherein the sensors are configured to output the global detection signal when both the local enabling means and the neighborhood enabling means are triggered.

Preferred embodiments of the method are provided in claims 2 to 10.

The system comprises a plurality of pixel sensors. The sensors are grouped in at least one local cluster comprising at least two pixel sensors. Each pixel sensor of the local cluster adjoins at least one other pixel sensor of the local cluster. The sensors may be arranged in rows and columns. It is an advantage of embodiments of the present invention that sensors in one cluster collaborate or work or assist one another to obtain a more accurate detection.

The system further comprises at least one light source.

Each sensor comprises a photodetector. The photodetector is capable of detecting single photons impinging thereon. The single photons are generated by the at least one light source. The photodetector has an output for outputting an electrical local detection signal upon detection of a photon.

Each sensor further comprises a local controlling circuit. The plurality of sensors in the cluster are configured, using the local controlling circuit, to output a global detection signal when detecting a local detection signal from at least two outputs of the photodetectors of said cluster.

Global detection signals of different clusters may be aggregated with one another to form a cluster detection signal, which may be outputted on a cluster bus.

It is an advantage of embodiments of the present invention that photons impinging on an area between of two neighboring clusters may be detected, since each sensor may be associated with more than one cluster.

The local controlling circuit of each sensor may comprise local enabling means and neighborhood enabling means. The neighborhood enabling means is connected to the local enabling means. The local detection signal of the sensor is provided to the local enabling means in the sensor. The neighborhood enabling means of the sensor is provided with at least one local detection signal of at least one other sensor in the cluster. The sensors are configured to output the global detection signal when both the local enabling means and the neighborhood enabling means are triggered.

It is an advantage of embodiments of the present invention that the local detection signal of other sensors in the cluster reduces the chances of a false detection. It is an advantage of embodiments of the present invention that a false detection of one sensor does not result in a global detection signal. It is an advantage of embodiments of the present invention that a more accurate detection is obtained. It is an advantage of embodiments of the present invention that a high accuracy sensor is obtained. It is an advantage of embodiments of the present invention that the effect of ambient light or thermal noise on the accuracy of detection is reduced.

The photodetector may be a single-photon detector. The photodetector may alternatively be a single-photon avalanche diode.

The local enabling means and/or the neighborhood enabling means may comprise transistors. The local detection signals, the global detection signals, and the cluster detection signals are preferably binary signals.

The system may further comprise a buffer connected to the photodetector output of each sensor. The buffer may be a comparator. The buffer may compare the photodetector output to a predetermined threshold voltage level. It is an advantage of embodiments of the present invention that the buffer separates the photodetector output from the local controlling circuit. It is an advantage of embodiments of the present invention that photodetector output below the threshold voltage level are not passed into the local controlling circuit, so as to prevent any noise or error signals.

The system may further comprise a plurality of row busses and a plurality of column busses. The sensors may be arranged in a plurality of rows and a plurality of columns. Each pixel sensor row is connected and associated to at least one row bus. Similarly, each pixel sensor column is connected and associated to at least one column bus.

The global detection signal of each sensor may be connected to the associated row bus and column bus. The global detection signals in each row may be aggregated with one another to form a row detection signal. Similarly, the global detection signals in each column may be aggregated with one another to form a column detection signal.

The system may further comprise synchronization means. The synchronization means synchronize the row and the column detection signals.

The system may comprise a hundred sensors. One row may comprise a maximum of fifty sensors. Further, one column may comprise a maximum of fifty sensors.

Further advantages of the invention and in particular of preferred embodiments, are disclosed in the detailed description below.

DETAILED DESCRIPTION

Figure 1:
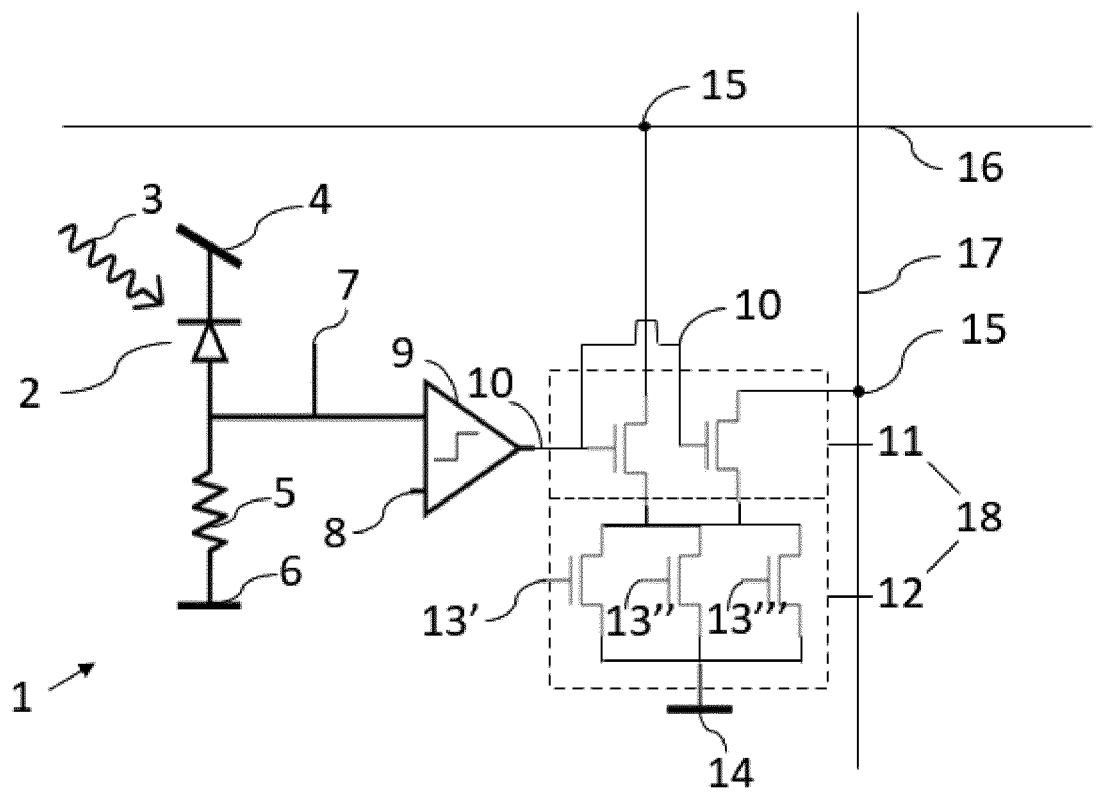
FIG. 1 shows a circuit implementation of a pixel sensor (1), according to embodiments of the present invention.

The present invention relates to an imaging sensor system.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a contaminant" refers to one or more than one contaminant.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

In a first aspect, the present invention relates to an imaging sensor system comprising:
 a plurality of pixel sensors (1), wherein the pixel sensors (1) are grouped in at least one local cluster comprising at least two pixel sensors (1), wherein each pixel sensor (1) of the local cluster adjoins at least one other pixel sensor of the local cluster, wherein each sensor (1) comprises:
  a photodetector capable of detecting single photons impinging thereon, the photodetector having an output for outputting an electrical local detection signal upon detection of a photon,
  a local controlling circuit,
  wherein the plurality of sensors in the cluster are configured, using a local controlling circuit, to output a global detection signal when detecting a local detection signal from at least two outputs of the photodetectors of said cluster;
at least one light source;
wherein the local controlling circuit of each sensor comprises:
  local enabling means,
  neighborhood enabling means, connected to the local enabling means,
  wherein the local detection signal of the sensor is provided to the local enabling means in the sensor,
  wherein the neighborhood enabling means of the sensor is provided with at least one local detection signal of at least one other sensor in the cluster,
wherein the sensors are configured to output the global detection signal when both the local enabling means and the neighborhood enabling means are triggered.

In a preferred embodiment, the system comprises a plurality of pixel sensors. The sensors are grouped in at least one local cluster comprising at least two pixel sensors. Each pixel sensor of the local cluster adjoins at least one other pixel sensor of the local cluster. For example, each cluster comprises a minimum of two adjoining pixel sensors e.g. in close proximity. In a more preferred embodiment, each cluster comprises four adjoining pixel sensors e.g. in close proximity of one another.

In a preferred embodiment, the sensors in one cluster collaborate with one another. In a more preferred embodiment, adjoining sensors in one cluster collaborate or work or assist one another. Such a collaboration allows a more accurate detection.

In a preferred embodiment, the system further comprises at least one light source. For example, the light source is adapted to be in a wavelength detectable by the sensors.

In a preferred embodiment, each sensor comprises a photodetector. The photodetector may be arranged in a reverse biased configuration. The photodetector is capable of detecting single photons impinging thereon. The single photons are generated by the at least one light source, at a wavelength suitable for the photodetector. The photodetector has an output for outputting an electrical local detection signal upon detection of a photon. For example, a local detection signal may be represented by a signal comprising logic '1' e.g. a detection, while no local detection signal may be represented by a signal comprising logic '0' e.g. no detection.

In a preferred embodiment, the photodetector may be a single-photon detector. The photodetector may alternatively preferably be a single-photon avalanche diode.

In a preferred embodiment, the photodetector may for example be biased in a voltage divider configuration, or any other suitable configuration. For example, the photodetector may be connected to a voltage supply, in one end, and to a resistor on the other end. For example, the voltage supply has a voltage between 3 and 20 V, and the resistor has a resistance of hundreds of kilo Ohms. The resistance is connected to a reference level, preferably a ground level e.g. 0 V. The skilled person appreciates that these values will depend on the design of the circuit, and the breakdown voltage of the single-photon avalanche diode. The output of the photodetector (for example in this case having the same voltage level as the voltage dropped on the resistor) is between the voltage of the voltage supply, and the ground level.

In a preferred embodiment, each sensor further comprises a local controlling circuit. The plurality of sensors in the cluster are configured, using the local controlling circuit, to output a global detection signal when detecting a local detection signal from at least two outputs of the photodetectors of said cluster. For example, in a cluster comprising two adjoining sensors, the local controlling circuit outputs a global detection signal when detecting two local detection signals from said sensors. For example, one global detection signal per sensor.

In a preferred embodiment, global detection signals of different clusters may be aggregated with one another to form a cluster detection signal, which may be outputted on a cluster bus. For example, this allows to obtain information about which cluster have had a detection.

In a preferred embodiment, a bus is a data highway. For example, data of more than one sensor may be loaded on a bus, such that it would be possible to find out which data belongs to which sensor at the receiving side.

In a preferred embodiment, each sensor may be associated with more than one cluster. For example, a system comprising three sensors on one straight row may comprise two clusters, one cluster comprising the two left most sensors, and one cluster comprising the two right most sensors. In this case, the middle sensor is part of both clusters. Having sensors associated with more than one cluster is advantageous in case the required detection falls in between two clusters. For example, a number of pixel sensors being at least two pixel sensors surrounding one another may be considered one cluster. For example, one sensor, and an adjoining sensor.

In a preferred embodiment, the local controlling circuit of each sensor may comprise local enabling means and neighborhood enabling means. The neighborhood enabling means is connected to the local enabling means, for example in series, or both connected to a logic gate e.g. an AND gate. The local detection signal of the sensor is provided to the local enabling means in the sensor. The neighborhood enabling means of the sensor is provided with at least one local detection signal of at least one other sensor in the cluster. The sensors are configured to output the global detection signal when both the local enabling means and the neighborhood enabling means are triggered e.g. in at least two sensors in the cluster. For example, each sensor having its local enabling means and neighborhood enabling means triggered, may generate a global detection signal.

In a preferred embodiment, the number of local detection signals needed to trigger the neighborhood enabling means of a sensor may be variable. This depends on the time difference between receiving photons in the different sensors of one cluster. For example, in one scenario, a sensor in a cluster with eight neighboring sensors may require local detection signals of more than half of the sensors in the cluster e.g. eight local detection signals of the eight neighboring sensors, in case photons are not received simultaneously, or photons are received with a large time difference, by the sensor and the eight neighboring sensors. For example, in another scenario, a sensor in a cluster with eight neighboring sensors may require local detection signals of less than half of the cluster e.g. one local detection signal of one neighboring sensor, in case the photons are received simultaneously on both the sensor and the one neighboring sensor. In another example, if photons are received by the sensor and the neighboring sensors with a time delay between e.g. the sensor and a neighboring sensor, the time delay may be used in setting the number of local detection signals needed to trigger the neighborhood enabling means.

In a preferred embodiment, the local detection signal of one sensor, and the local detection signal of neighboring sensors used for triggering the neighborhood enabling means, are not generated at the same time. For example, the local detection signal of a first sensor is generated at time T1, as a result of photon detection on said sensor. The local detection signal of the neighboring sensor may be generated at time T1+D, wherein D is a delay, for example if the movement of the light source was very slow. By the time the local detection signal of the neighboring sensor is generated, it is possible that the local detection signal of the first sensor has finished, as no photons are detected thereon. A predefined value of the delay D may be required to determine whether or not the detection is a false positive.

In a preferred embodiment the neighborhood cluster can thus be triggered by a sufficiently larger optical signal, covering a plurality of pixels in the neighborhood and triggering at least 1 pixel in the neighborhood within a short time window.

In another preferred embodiment, the neighborhood cluster can thus be triggered by an optical signal with an instantaneous special footprint which is equal or smaller than a single pixel, but which moves spatially within a set time window D to trigger neighboring pixels sequentially within the time window D, thus triggering the neighborhood cluster.

In a preferred embodiment, for example, the neighborhood enabling means in each sensor is provided with local detection signals of one another sensor in the cluster, more preferably, of half or more than half of the neighboring sensors in the cluster, most preferably of all the neighboring sensors in the cluster.

In a preferred embodiment, a cluster may comprise at least two sensors, a first sensor and a second sensor. For example, the sensors are adjoining or in close proximity of one another. In the presence of impinging photons on the cluster, the local enabling means of the first sensor is triggered by the local detection signal of the photodetector of the first sensor. Similarly, the local enabling means of the second sensor is triggered by the local detection signal of the photodetector of the second sensor. The local detection signal of the second sensor triggers the neighborhood enabling means of the first sensor. Similarly, the local detection signal of the first sensor triggers the neighborhood enabling means of the second sensor. For example, if the local enabling means are triggered in both sensors, the neighborhood enabling means are also triggered in both sensors, and therefore a global detection signal is outputted by the two sensors. The global detection signal represents that at least two sensors (e.g. in close proximity) in one cluster had photons impinging on the photodetector thereof.

In a preferred embodiment, for example, the global detection signal represents photons impinging on photodetectors of sensors that are neighboring or in close proximity to one another. This is useful to rule out any false detections, since a false detection is more likely to occur as a result of a false detection of one detector, and less likely as a result of a false detection of a two or more detectors e.g. a group of detectors, collaborating and in close proximity of one another. A detection based on more than one sensor is more reliable and more accurate than a detection based on only one sensor. For example, a detection based on two sensors reduces the chances of a false detection. A false detection may be a result of ambient light or thermal noise, which is less likely to happen in more than one adjoining sensors. In case a false detection occurs, (for example as a result of a false detection by only one sensor while no detection occurs in any of its adjoining sensors or sensors in close proximity), then this does not result in a global detection signal.

In a preferred embodiment, the term "triggering" may be interpreted as receiving a high voltage signal, e.g. a signal with a logic '1', e.g. a signal representing an ON state. For example, triggering the neighborhood enabling means may refer to receiving a signal with e.g. a logic '1' at the neighborhood enabling means.

In a preferred embodiment, sensors associated with more than one cluster, for example two clusters, may have their local detection signals provided to neighborhood enabling means of sensors (e.g. two sensors) belonging to different clusters.

In a preferred embodiment, the local detection signals and the global detection signals, the cluster detection signal, or any other signals in the system, are preferably binary signals.

In a preferred embodiment, the local enabling means and the neighborhood enabling means may comprise transistors. The transistors are preferably NMOS transistors. Each transistor may be operating as a switch.

In a preferred embodiment, the photodetector output has a logic '1' when photons are detected on the photodetector, and has a logic '0' when no photons are detected on the photodetector.

In a preferred embodiment, the local detection signal is either logic '1' or logic '0'. For example, a transistor of the local enabling means is ON when the local detection signal has a logic '1', and is OFF when the local detection signal has a logic '0'.

In a preferred embodiment, for example, a transistor of the neighborhood enabling means is ON when the local detection signal provided thereto from another one adjoining sensor has a logic '1', and is OFF when said local detection signal has a logic '0'.

In a preferred embodiment, for example, if the neighborhood enabling means of one first sensor is triggered by local detection signals of at least one adjoining sensor, the transistor of the neighborhood enabling means is ON. Likewise, the local detection signal of the first sensor triggers the transistor of the neighborhood enabling means of the at least one adjoining sensor.

In a preferred embodiment, the neighborhood enabling means and the local enabling means are connected. For example, they are in series. For example, if both the local enabling means and the neighborhood enabling means are triggered, the two e.g. transistors or e.g. switches of the local enabling means and the neighborhood enabling means are ON, and a global detection signal is outputted by the sensor. For example, the same global detection signal is outputted by the adjoining sensors, since they have each of their neighborhood enabling means provided with the local detection signals of one another.

In a preferred embodiment, the neighborhood enabling means and the local enabling means may comprise a logic gate e.g. AND gate. For example, if the local detection signal has a logic '1', and the local detection signal of an adjoining sensor has a logic '1', then the output of the AND gate is a logic '1', and a global detection signal is generated in each of the two sensors. Alternatively, the logic gate may be substituted by two transistors acting as switches, or two switches. For example, one transistor is comprised in the local enabling means in series with one transistor comprised in the neighborhood enabling means, so as to allow current to flow through the two transistors when both transistors are switched ON.

In a preferred embodiment, the neighborhood enabling means and the local enabling means may comprise a logic gate e.g. an AND gate. For example, if the local detection signal has a logic '1', and two or more local detection signals of two or more adjoining sensors have a logic '1', then the output of the of the AND gate is a logic '1', and a global detection signal is generated in each of the three or more sensors. Alternatively, the logic gate may be substituted by three transistors acting as switches, or three switches. For example, one transistor is comprised in the local enabling means in series with two transistors in series comprised in the neighborhood enabling means, so as to allow current to flow through the three transistors when all transistors are switched ON. The skilled person appreciates that different circuit configurations may be envisaged.

In a preferred embodiment, each bus may be connected to a voltage bias. For example, if the local enabling means and the neighborhood enabling means are triggered e.g. the transistors or switches are ON, a current flows through the local enabling means and the neighborhood enabling means. This current flowing is thereafter sensed by e.g. a sensing amplifier e.g. at the other end of the bus. In another preferred embodiment, the bus may be pre-charged. For example, if the local enabling means and the neighborhood enabling means are triggered e.g. the transistors or switches are ON, the charge in the bus is discharged through the local enabling means and the neighborhood enabling means. This discharge is thereafter sensed by e.g. a sensing amplifier e.g. at the other end of the bus.

In a preferred embodiment, the number of neighboring sensors needed to allow generating a global detection signal may be designed e.g. according to the design requirements, and may have different circuit implementations, depending on said number.

In a preferred embodiment, the system may further comprise a buffer connected to the photodetector output of each sensor. Preferably, the buffer may be a comparator. For example, the buffer may compare the photodetector output to a predetermined threshold voltage level. Preferably, the threshold voltage level may be between 0.5 and 2 V, more preferably between 0.6 and 1 V. The buffer may be useful for separating the photodetector from the local controlling circuit. The buffer may further be useful to prevent any signals having a voltage below the threshold voltage level not to be passed into the local controlling circuit.

In a preferred embodiment, the system may further comprise a plurality of row busses and a plurality of column busses. Each pixel sensor row is connected and associated to at least one row bus. Similarly, each pixel sensor column is connected and associated to at least one column bus.

In a preferred embodiment, the local enabling means may comprise two transistors, for example one is connected to the row bus, and another is connected to the column bus. The photodetector output of each pixel sensor is connected to the row bus through one transistor in the local enabling means, and to the column bus through one another transistor in the local enabling means.

In a preferred embodiment, the sensors on neighboring rows and columns may be in one cluster. For example, a sensor in row x and column y may be together in one cluster with another sensor in row x+1 and column y. For example, sensors between x−1 and y−1, and x+1 and y+1 may all be in one cluster. For example, the sensors may be arranged in a matrix configuration.

In a preferred embodiment, the global detection signal of each sensor may be provided to the associated row bus and column bus. The global detection signals in each row may be aggregated with one another to form a row detection signal. For example, the row detection signal comprises global detection signals of each sensor in the row. Similarly, the global detection signals in each column may be aggregated with one another to form a column detection signal. For example, the column detection signal comprises global detection signals of each sensor in the column.

In a preferred embodiment, the system may further comprise synchronization means. The synchronization means synchronize the row and the column detection signals. For example, row detection signals of different rows are synchronized, and column detection signals of different columns are synchronized.

In a preferred embodiment, the system may comprise a hundred sensors. For example, one row may comprise a maximum of fifty sensors. Further, for example, one column may comprise a maximum of fifty sensors.

Further characteristics and advantages of embodiments of the present invention will be described with reference to the figures. It should be noted that the invention is not restricted to the specific embodiments shown in these figures or described in the examples, but is only limited by the claims.

FIG. 1 shows a circuit implementation of a pixel sensor (1). The sensor (1) comprises a photodetector (2), for example a single-photon detector or a single-photon avalanche diode. The photodetector (2) is capable of detecting single photons (3) impinging thereon.

The photodetector (2) is biased by a voltage source (4), and is connected to a resistor (5) in a voltage-splitting configuration. The photodetector (1) is arranged in a reverse biased configuration. The resistor (5) is connected to a first reference potential level (6), preferably a ground level, or a zero V.

In the presence of photons (3) impinging on the photodetector (2), a reverse current is generated. This results in a voltage drop (7) on the resistor (5). The voltage drop (7) has a logic '1' when photons (3) are detected on the photodetector (2), and has a logic '0' when no photons (3) are detected on the photodetector (2).

The voltage drop (7) is compared with a predetermined threshold voltage level (8) through a comparator (9). If the voltage drop (7) is higher than the reference voltage (8), a local detection signal (10) is generated at the output of the comparator (9). For example, logic '1' is generated at the output of the comparator in case of a detection, and logic '0' is generated at the output of the comparator in case of no detection.

Each sensor (1) comprises a local controlling circuit (18). The comparator (9) acts as a buffer between the photodetector (2) and the local controlling circuit (18). The local controlling circuit (18) comprises local enabling means (11) and neighborhood enabling means (12).

The controlling circuit or portions of it, may be physically located on another layer in the sensor system. For instance the sensors (1) of the sensing array may be located on a first semiconductor layer, the controlling circuits (18) of each of the sensors (1) in the array may be located on a second semiconductor layer, forming what is known in the field to be a stacked sensor solution.

The local detection signal (10) is provided to the local enabling means (11). The local enabling means (11) comprises two NMOS transistors. Other transistor types or configurations may be envisaged. The local detection signal (10) is provided to the gates of said transistors. One transistor is connected to a row bus (16), while the other is connected to a column bus (17). If a local detection signal (10) is received at the gates of the transistors of the local enabling means (11), the local enabling means (11) is triggered. In this case, the transistors act as a switch, and a logic '1' is received at the transistors results in the switch being ON e.g. short circuit.

The local enabling means (11) are connected to the neighborhood enabling means (12). In this case, each transistor in the local enabling means (11) are connected to the neighborhood enabling means. The neighborhood enabling means (12) comprise at least one transistor, in this example three transistors, having gates (13', 13", 13'"). The gates (13', 13", 13'") of the three transistors are connected to local detection signals of neighboring sensors. The transistors are also connected to a second reference potential level (14), preferably equal to the first reference potential level (6), preferably a ground or a zero V. If at least one local detection signal is received from one neighboring sensor at one gate, for example (13'), the neighborhood enabling means are triggered. This means in this case if the gate (13') has a logic '1', then the transistor, acting here as a switch, is ON e.g. a short circuit. If both the local enabling means and the neighborhood enabling means are triggered, meaning that the transistors in the local enabling means are acting as a short circuit, and one transistor in the neighborhood enabling means is acting as a short circuit, a global detection signal (15) is outputted on the row bus (16) and on the column bus (17). The global detection signals of different sensors on the row bus (16) are aggregated to form a row detection signal. The global detection signals of different sensors on the column bus (17) are aggregated to form a column detection signal. The local controlling circuit (18) in this example acts as an AND gate. For example, when the local enabling means (11) and the neighborhood enabling means (12) are triggered, the global detection signal (15) is generated.

Two implementations are envisaged. In the first implementation, each bus (16, 17) may be connected to a voltage bias. For example, if the local enabling means (11) and the neighborhood enabling means (12) are triggered, a current flows through the local enabling means (11) and the neighborhood enabling means (12). This current flowing is thereafter sensed by e.g. a sensing amplifier e.g. at the other end of the bus. This current is also referred to in this case as the global detection signal (15).

In the second implementation, each bus (16, 17) may be pre-charged. For example, if the local enabling means (11) and the neighborhood enabling means (12) are triggered, the charge in the bus is discharged through the local enabling means (11) and the neighborhood enabling means (12). This discharge is thereafter sensed by e.g. a sensing amplifier e.g. at the other end of the bus. This discharge is also referred to in this case as the global detection signal (15).

Figure 2:
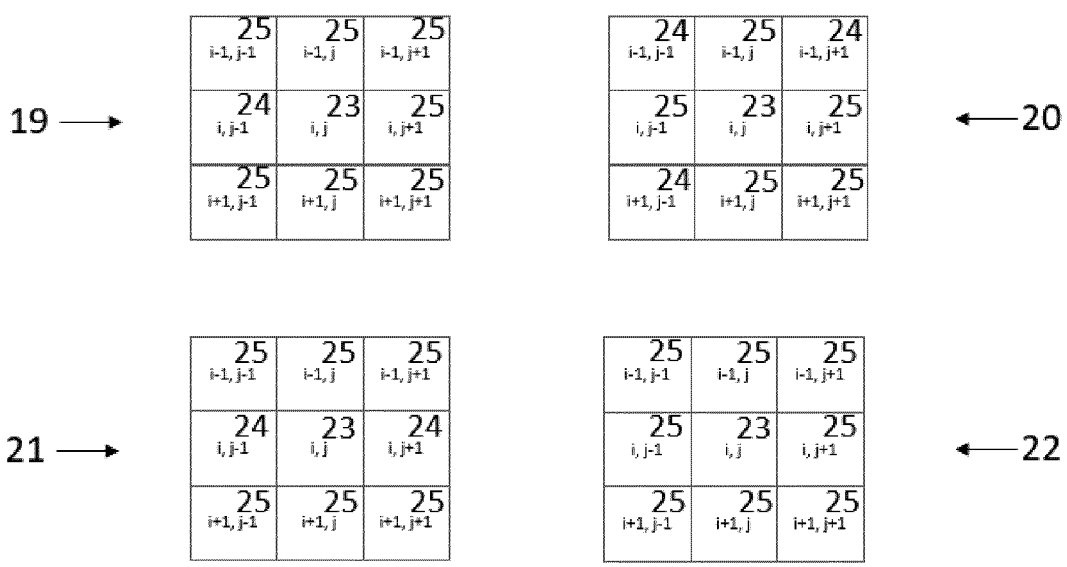
FIG. 2 shows four sensor clusters (19-22), according to embodiments of the present invention.

FIG. 2 shows four clusters of pixel sensors. Each sensor has a coordinate. For example, a first pixel cluster (19) comprises a first sensor (23) at location (i, j), and eight neighboring sensors.

The neighboring sensors comprise sensors with a local detection signal (24), e.g. having a positive detection, e.g. having a local detection signal with a logic '1', and sensors with no local detection signal (25), e.g. having a negative detection e.g. no detection, e.g. having a local detection signal with a logic '0'. In this case, the first pixel cluster (19) has one positive detection among the neighboring sensors. Similarly, a second pixel cluster (20) has three positive detections among the neighboring sensors, a third pixel cluster (21) has two positive detections among the neighboring sensors, and a fourth pixel cluster (22) has no positive detections.

For example, assuming that the first sensor (23) in the clusters (19-22) is configured to output a global detection signal (15) when the first sensor (23) and one neighboring sensor have positive detection, all the clusters (19-22) would result in a global detection signal (15) from the first sensor and the neighboring sensor, e.g. a global detection signal having a logic '1'. Assuming however that the first sensor (23) in the clusters (19-22) are configured to output a global detection signal (15) when the first sensor (23) and two neighboring sensor have positive detection, all the clusters (19-22) except the first cluster (19) would result in a global detection signal (15) from the first sensor and the neighboring sensors e.g. a positive detection. The number of neighboring sensors required to have a positive detection for the overall cluster detection to be considered positive depends on the design requirements.

Figure 3:
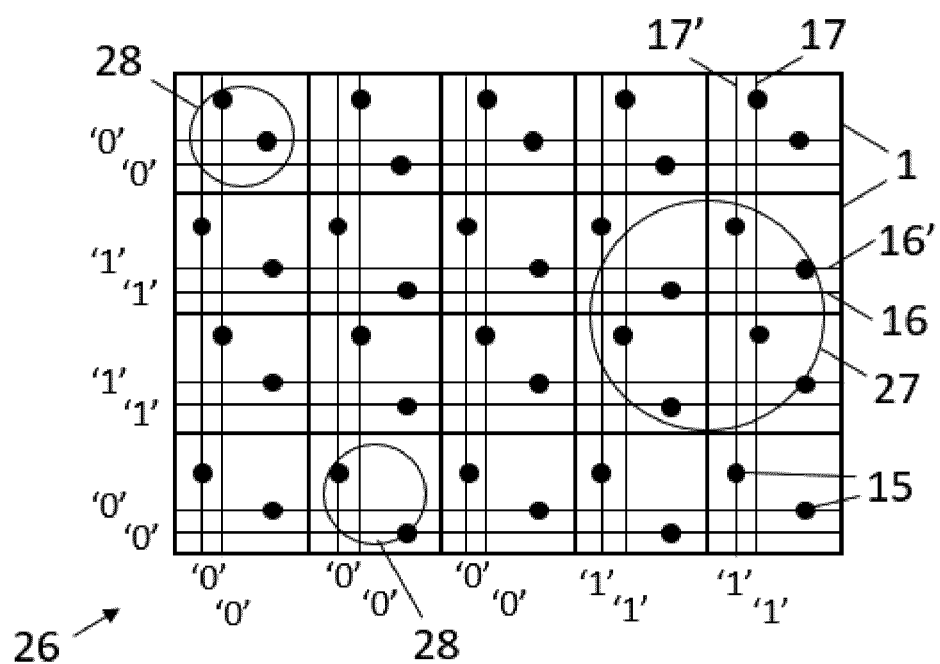
FIG. 3 shows a schematic representation of an imaging sensor system (26), comprising pixel sensors (1) connected in rows and columns, according to embodiments of the present invention.

FIG. 3 shows a schematic representation of an imaging sensor system (26), comprising pixel sensors (1) connected in rows and columns. Every row of sensors (1) are connected to two row busses (16, 16'), and to two column busses (17, 17'). The sensors (1) provide a global detection signal (15), said signal is a binary signal.

Three cases are illustrated in FIG. 3. In the first case, photons are impinging on more than one sensor at the same time, in this case four sensors at the same time. A first circle (27) illustrates an area impinged by photons. In this case, the detection is a correct detection, since more than sensor (1) is sensing photons. Each sensor has a local detection signal, for example having a logic '1'. The local detection signal of each sensor is also connected to and triggers the neighborhood enabling means of neighboring or adjoining sensors. For example, transistors belonging to the local enabling means and to the neighborhood enabling means are triggered in said four sensors. This generates a global detection signal by each sensor, having a logic '1', said signal is outputted to the associated row busses and column busses.

In the second and third cases, a second circle (28) illustrates an area of suspected photon detection. In this case, the detections are false detections, since none of the neighboring sensors have sensed such a detection. Hence the neighborhood enabling means are not triggered, and therefore no global detection signal is generated, or the global detection signals have logic '0', outputted to the associated row busses and column busses. This false detection may be as a result of ambient light or thermal noise.

The proceeding description gives details of certain embodiments of the present invention. It will, however, be clear that no matter how detailed the above turns out to be in text, the invention may be applied in many ways. It should be noted that the use of certain terminology when describing certain characteristics or aspects of the invention should not be interpreted as implying that the terminology herein is defined again to be restricted to specific characteristics or aspects of the invention to which this terminology is coupled.

The invention claimed is:
1. An imaging sensor system, comprising:
a plurality of pixel sensors, wherein the pixel sensors are grouped in at least one local cluster comprising at least two pixel sensors, wherein each pixel sensor of the at least one local cluster adjoins at least one other pixel sensor of the at least one local cluster, wherein each pixel sensor comprises:

a photodetector capable of detecting single photons impinging thereon, the photodetector having an output for outputting an electrical local detection signal upon detection of a photon;

a local controlling circuit, wherein the plurality of pixel sensors in the at least one local cluster are configured, using the local controlling circuit, to output a global detection signal when detecting a local detection signal from at least two outputs of the photodetectors of the at least one local cluster; and at least one light source;

wherein the local controlling circuit of each pixel sensor comprises: a local enabling circuit, and a neighborhood enabling circuit connected to the local enabling circuit, wherein the local detection signal of the pixel sensor is provided to the local enabling circuit in the pixel sensor, wherein the neighborhood enabling circuit of the pixel sensor is provided with at least one local detection signal of at least one other pixel sensor in the at least one local cluster, wherein the pixel sensors are configured to output the global detection signal when both the local enabling circuit and the neighborhood enabling circuit are triggered wherein the plurality of pixel sensors in the at least one local cluster are configured to output the global detection signal when detecting a local detection signal from at least two outputs of the photodetectors of the local cluster within a predetermined time delay.

2. The imaging sensor system of claim 1, wherein the photodetector is a single-photon detector or a single-photon avalanche diode.

3. The imaging sensor system of claim 1, wherein the local enabling circuit or the neighborhood enabling circuit comprise transistors.

4. The imaging sensor of claim 3, wherein the transistors are NMOS transistors.

5. The imaging sensor of claim 3, wherein current flows through the transistor of the local enabling circuit and the transistor of the neighborhood enabling circuit when both transistors are switched on.

6. The imaging sensor of claim 3, wherein the local detection signal is provided to gates of the transistors.

7. The imaging sensor of claim 3, wherein the transistors comprise a transistor coupled to the at least one row bus and a transistor coupled to the at least one column bus.

8. The imaging sensor system of claim 1, wherein at least one pixel sensor further comprises a buffer connected to the photodetector output of the at least one pixel sensor, wherein the buffer compares the photodetector output to a predetermined threshold voltage level.

9. The imaging sensor of claim 8 wherein an output of the buffer is the local detection signal.

10. The imaging sensor system of claim 1, wherein the global detection signals of different clusters are aggregated with one another to form a cluster detection signal.

11. The imaging sensor of claim 10, wherein the cluster detection signal is a binary signal.

12. The imaging sensor system of claim 1, wherein the local detection signals and/or the global detection signals are binary signals.

13. The imaging sensor system of claim 1, wherein at least two pixel sensors are associated with more than one cluster.

14. The imaging sensor of claim 13, wherein the local detection signals of the at least two pixel sensors are provided to neighborhood enabling circuits associated with different clusters.

15. The imaging sensor system according to claim 1, wherein the system comprises a maximum of hundred pixel sensors or a maximum of fifty pixel sensors connected in one row or in one column.

16. The imaging sensor of claim 1, wherein the local enabling circuit and the neighborhood enabling circuit are connected in series.

17. The imaging sensor of claim 1, wherein the plurality of pixel sensors is located on a first semiconductor layer, and the local controlling circuit of each pixel sensor is located on a second semiconductor layer.

18. The imaging sensor of claim 1, wherein the global detection signals in each row are aggregated with one another to form a row detection signal, and wherein the global detection signals in each column are aggregated with one another to form a column detection signal.

19. The imaging sensor system according to claim 18, further comprising a synchronization circuit for synchronizing the row and the column detection signals.

* * * * *